July 10, 1945.  H. C. REES  2,380,263
APPARATUS FOR MEASURING THE DISTANCE BETWEEN VISUAL AXES OF THE
EYES AND FOR DETERMINING VERTICAL INBALANCE OF THE
EYES OR EYEGLASS LENSES
Filed June 7, 1941   2 Sheets-Sheet 1

INVENTOR.
HERBERT C. REES
BY Rodney Bedell
ATTORNEY

July 10, 1945.　　　　　H. C. REES　　　　　2,380,263
APPARATUS FOR MEASURING THE DISTANCE BETWEEN VISUAL AXES OF THE
EYES AND FOR DETERMINING VERTICAL INBALANCE OF THE
EYES OR EYEGLASS LENSES
Filed June 7, 1941　　　　2 Sheets-Sheet 2
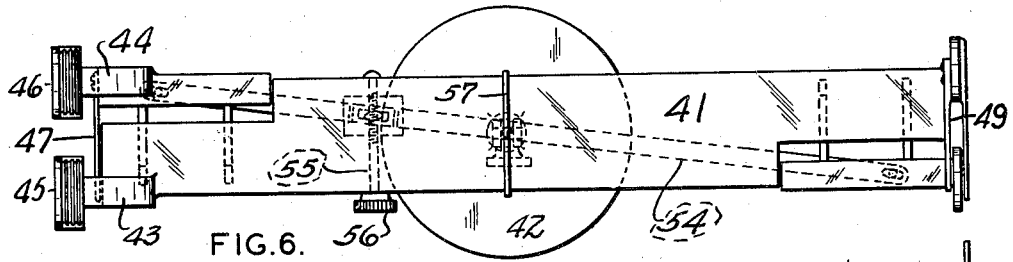
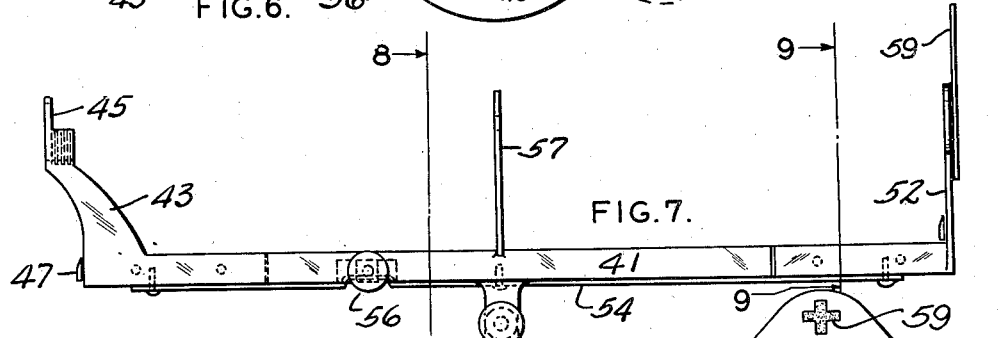
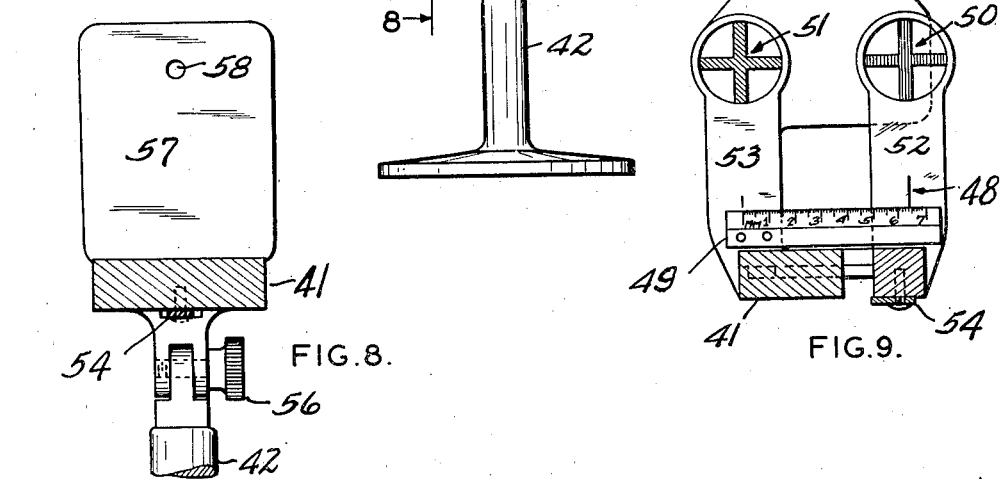
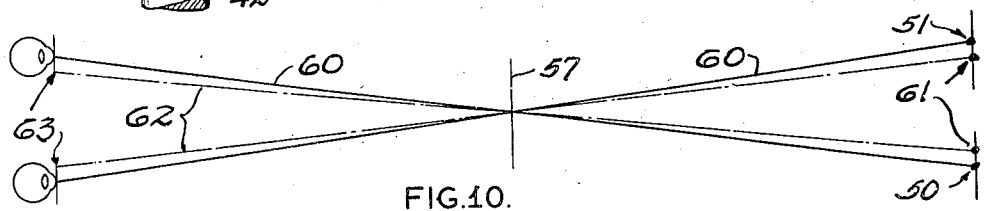
INVENTOR.
HERBERT C. REES
BY
ATTORNEY Patented July 10, 1945

2,380,263

UNITED STATES PATENT OFFICE 2,380,263

APPARATUS FOR MEASURING THE DISTANCE BETWEEN VISUAL AXES OF THE EYES AND FOR DETERMINING VERTICAL INBALANCE OF THE EYES OR EYEGLASS LENSES

Herbert C. Rees, San Antonio, Tex.

Application June 7, 1941, Serial No. 396,984

5 Claims. (Cl. 88—20)

The invention relates to the fitting of eyeglass lens to the eyes of the user and involves the determining of the correct spacing of the optical centers of a pair of eyeglass lenses and the correction of vertical inbalance resulting from defects in the eyes or the eyeglass lenses. This involves accurate measurement of the distance between the nodal points of the two eyes during binocular vision as distinguished from the common practice of attempting, after a fashion, to measure the distance between the pupils by the oculist's or optometrist's judgment based upon using a scale held in front of the patient's eyes. Also involved in the ready determining of the condition of vertical inbalance which may result from an abnormal condition of the muscles of the eyes or an incorrect inclination of the eyeglass lenses.

The nodal point of the eye is the point at which rays of light entering the eye converge irrespective of the physical movement of the eye and whether the eye is viewing a distant object or a nearer object. The nodal point is determined by the refraction of rays of light by the cornea and crystalline lens and is not fixed but may vary with the angle between the optical axis and the line of vision. The optical center of the eye is the point about which the eye rotates as it turns from left to right, or vice versa, and this center does not coincide with the nodal point. The optical axis of the eye is the straight line from the apex of the cornea through the center of the macula lutea (that is, the area of clear vision at the rear of the retina) and should pass through the optical center. The visual axis is the line of light reflected from the object being viewed and passing through the nodal point to the macula and, more particularly, to the clearest vision center of the macula. The optical center is behind the nodal point at distances which vary, particularly with defects in the eye. The angle between the optical axis and the visual axis varies from 2 degrees in myopia, 5 degrees in emmetropia to 7 degrees in hypermetropia. The distance between the pupils is not necessarily the distance between the visual axes.

It is common practice for the operator, i. e. oculist, optometrist or optician, to measure with his eye and by the use of an ordinary scale the distance between the pupils of the eyes to determine what is commonly called the pupillary distance or P. D. He places a scale across the bridge of the patient's nose and sights from his own eye across the scale to the centers or edges of the patient's pupils and in this sighting usually one eye of the operator will determine where the line of his sight crosses the scale and the two lines from that eye to the two eyes of the patient will diverge from the operator's eye. Accordingly the distance between these lines where they cross the scale would not correspond to the distance between the centers of the patient's pupils even if the operator were accurate in his estimation of the center or edge of each of the pupils, which itself is unlikely and makes possible further error in the measurement. Furthermore, this measurement, at best, would only be the measurement between the centers of the pupils, which might coincide with the optical axes, but would not necessarily coincide with the optical axes or with the visual axes or with the nodal points.

Since the coincidence of the optic centers of spectacle lenses and the visual axes of the eyes during normal binocular vision (i. e. as if glasses are not applied) is essential for proper fitting of the glasses, the importance of being able to determine the proper dimension is understood. It is the main object of the present invention to secure such accurate measurement.

As is well understood, each person has one eye which is stronger than the other and is termed the master eye, and when the eyes are focused upon an object, the optic axis of the master eye is substantially the same as the visual axis. In other words, the eyes turn until a straight line from the object through the pupil of the master eye extends through the point about which the eyeball rotates and the image of the object being viewed is centered on the retina about the point where this axial line strikes the same, which would be in the center of the macula. The two eyes by virtue of their innervation act in definite relationship and association with each other. In their service of the visual sense, they are directed as though they were a single organ.

The ray of light from the object to the non-fixing eye does not travel over the optic axis or the visual axis of that eye (as defined above) but strikes the cornea at an angle to the visual axis and is refracted by the elements of the eye so as to pass through the nodal point to the retina. (If the master eye be blocked or closed, the eyes will shift because the previously non-fixing eye becomes the master eye in the new monocular vision.)

This may not be generally recognized and may be inconsistent with the common understanding that the angle between the visual axes of the eyes changes substantially as the eyes shift their focus from a far point to a near point. This is demonstrated by the use of the apparatus described below, and it is another object of the present invention to demonstrate this physiological fact.

In the accompanying drawings forming a part of this specification—

Figure 1:
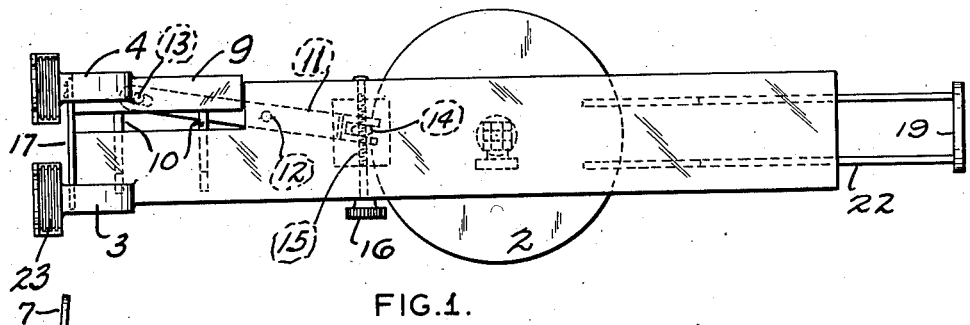
Figure 1 is a top view of an instrument embodying the apparatus invention and the use of which utilizes the method invention here disclosed.
Figure 2:
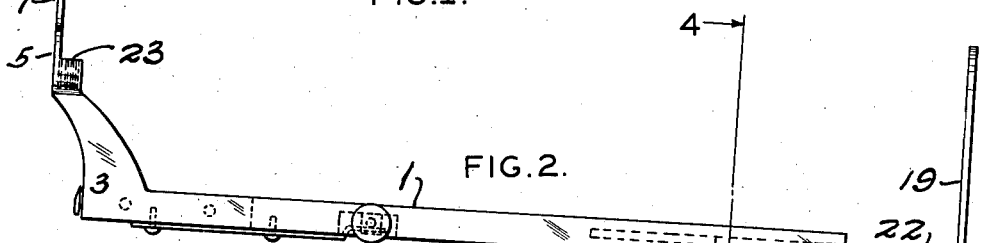
Figure 2 is a side elevation of the same.
Figure 3:
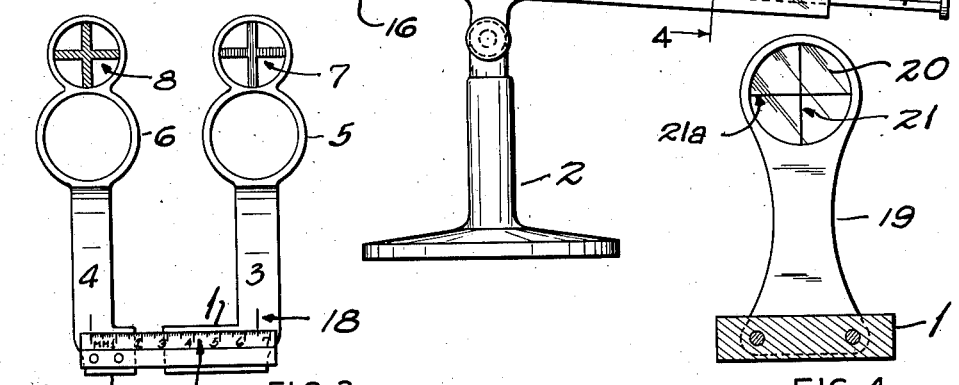
Figure 3 is a view of the left hand end of the instrument as shown in Figures 1 and 2.
Figure 4:
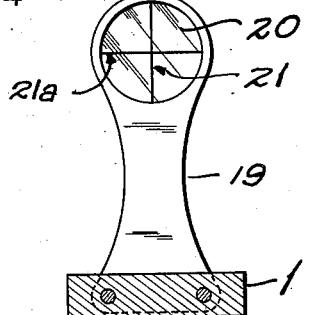
Figure 4 is a vertical transverse section taken on the line 4—4 of Figure 2.

Figures 6 and 7 correspond to Figures 1 and 2 but illustrate another form of the invention.

Figures 8 and 9 are vertical transverse sections taken on the corresponding section lines of Figure 7.

Figure 5:
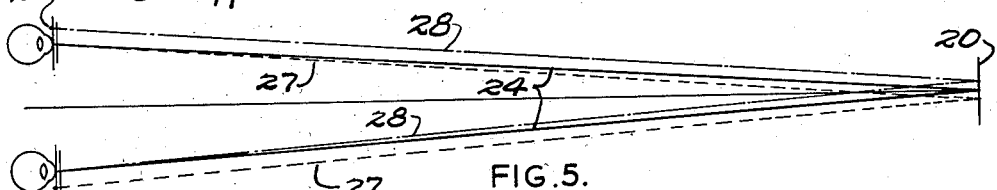
Figure 5 is a diagram illustrating the use of the instrument.

Figure 10 is a diagram corresponding to Figure 5 but illustrating the use of the instrument shown in Figures 6-9.

Figure 11:
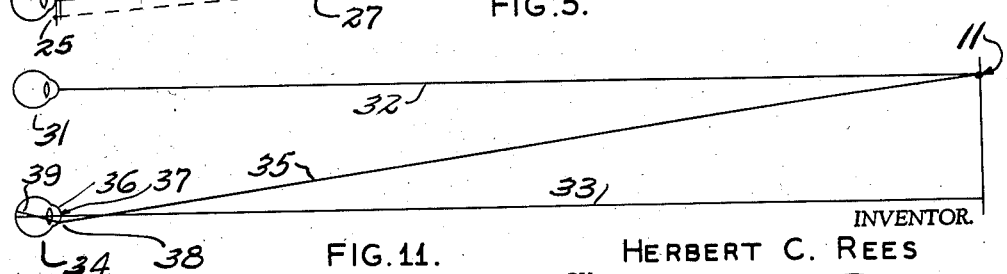

Figure 11 is a diagram illustrating the lines of binocular vision of a pair of human eyes as demonstrated by the use of the present invention but without relation to the use of the same.

In the instrument shown in Figures 1–5, an elongated table 1 is pivotally supported upon a base 2 so that the table may tilt in a vertical plane for the convenience of the user. At the left hand end of table 1 are two upright standards 3 and 4 each carrying annular frames 5 and 6 respectively and individual readily viewable objects 7 and 8 respectively, here indicated as crossed bands, although discs, beads, or other suitable elements would answer the purpose just as well. Preferably, elements 7 and 8 are given distinguishing colors, as red and green respectively, to facilitate their use. Frames 5 and 6, and the associated objects 7 and 8, are at opposite sides of the longitudinal center line of the table.

Standard 3 and the elements thereon are rigid with table 1. Standard 4 and the elements thereon are carried on a platform 9 slidably mounted on table 1, for movement transversely of the latter, as by dowels 10 slidably received in table 1. A lever 11 is fulcrumed at 12 to the bottom of table 1 and is pivoted at 13 to platform 9. The other end of lever 11 terminates in a nut-like element 14 having a threaded engagement with a transverse screw 15 journalled in table 1 and terminating at one end in a knurled knob 16 whereby the screw may be rotated to move lever 11, platform 9 and elements 4, 6 and 8 carried thereon transversely of the table and to or from corresponding elements 3, 5 and 7.

A scale 17 extends between standards 3 and 4, being fixed to the latter with its zero point in vertical alignment with the center of frame 6 and object 8. An indicating mark 18 is applied to standard 3 in vertical alignment with the center of frame 5 and object 7. When platform 9 is moved transversely of table 1, scale 17 will shift relative to mark 18 and the scale may be read to indicate the distance between the centers of frames 5 and 6.

At the opposite end of table 1, an upright standard 19 carries a mirror 20, preferably provided with cross lines 21 and 21a. Mirror 20 is located substantially above the longitudinal center line of table 1 and at such height that rays of light from the center of the right object 7 would be reflected back to the middle portion of the left frame 6 and rays of light from the left object 8 would be reflected back to the middle portion of the right frame 5. Each reflected ray passes to the retina of the corresponding eye through the nodal point of the eye. For certain demonstrating purposes, referred to hereafter, standard 19 is mounted on table 1 by means of dowels 22 slidable longitudinally in table 1, but this relative movement of the table and upright 19 is not required for the ordinary use of the instrument.

Preferably, frames 5 and 6 are provided with grooved cups 23 to receive corrective lenses for testing purposes where the patient's eyes are very abnormal, but ordinarily these corrective lenses will not be required in the use of the instrument.

In using the instrument, the patient places the bridge of his nose between frames 5 and 6 and views objects 7 and 8 through mirror 20, and the patient or the oculist or optometrist adjusts screw 15 until the patient observes the centers of the objects apparently coinciding with cross lines 21, as indicated in Figure 5 at 29, whereupon objects 7 and 8 will be placed apart the same distance as the visual axes when the eyes are being used for binocular vision. The position of mark 18 along scale 17 may be read to determine the proper distance between the optical centers of the spectacle lenses which are being fitted to the patient's eyes.

If objects 7 and 8 are immediately above the nodal points of the eyes and are the same distance apart as the nodal points then the path of the rays of light from each object 7 and 8 to the mirror and back to the eyes is indicated by the solid lines 24 (Figure 5), these lines converging at the center of the mirror. If objects 7 and 8 are spaced apart a greater distance than the nodal points of the eyes, as shown at 25 (Figure 5), then the rays of light from each object to the corresponding eye will be as indicated in the broken lines 27 and 28 respectively, and the reflections of the two objects in mirror 20 will be spaced apart as indicated at 26 and their vertical lines will not coincide with each other or with the vertical cross line 21 on the mirror. A similar result would follow if objects 7 and 8 were spaced apart a less distance than the nodal point of the eyes. If there is vertical inbalance of the eye muscles or if glasses are worn and the lenses are tilted relative to each other from their correct position, the horizontal cross lines of the objects will not coincide with each other or with the horizontal cross line 21a on the mirror.

On the basis of the common understanding that the visual axes of the eyes swing relative to each other when the view shifts from a given object to one farther away, it would appear that the distance between the nodal points or the more commonly used term "pupillary distance" would vary with the distance between standards 3, 4 and standard 19, but this is not the fact as is demonstrated by sliding the dowels 22 longitudinally of table 1, thereby moving standard 19 to different distances from standards 3 and 4 and repeating the test, i. e. adjusting the frames until the centers of objects 7 and 8, when viewed in mirror 20, coincide with cross lines 21. In each instance the distance between the objects will be the same.

This is explained by the fact that when the binocular vision is directed to any given object, as indicated at 30 (Figure 11), the eyes pivot as a unit until the ray of light 32 reflected from that object to the master eye 31 coincides with the visual axis of the master eye, which is also the optic axis of the master eye. The visual axis 33 of the non-fixing eye 34 remains substantially parallel to the visual axis of the master eye, and the ray of light 35 from object 30 to the non-fixing eye 34, instead of striking the cornea 36 at the point 37 where the visual axis intersects the cornea, strikes the cornea at a point 38 to one side of the visual axis and is refracted by the cornea, the aqueous humor, crystalline lens and vitreous humor, as indicated at 39. The angle between rays 32 and 35 and the distance between the visual axis of the non-fixing eye and the point where ray 35 strikes the cornea may change according to the distance between the eyes and the object, but the distance between the nodal points remains the same throughout the range of normal vision.

The measurement of the nodal distance and the demonstration of the fact that it does not change may be effected by the device shown in Figures 6-9 in which table 41, base 42, standards 43 and 44, frames 45 and 46, scale 47 and an associated mark (not shown) on standard 43 correspond to the similar elements in the structure previously described.

The viewable objects 50 and 51 are mounted upon standards 52 and 53 respectively, standard 53 being rigid with table 41. Standard 52 and standard 44 are mounted at opposite ends of a lever 54 pivoted intermediate its ends to table 41 so as to swing transversely of the table and thereby move standard 44 to and from standard 43 and to move standard 52 to and from standard 53. Such movement is effected by a screw 55 and knob 56.

In place of the reflecting mirror in the form previously described, table 41 carries an opaque screen 57 having a central aperture 58 located in a line extending between the central portions of object 51 and the opening in frame 45. Preferably, but not necessarily, a third objective point 59 is carried by standard 53 substantially above and midway of objects 50 and 51.

This device is utilized in substantially the same manner as that previously described, the patient placing his eyes before frames 45 and 46 and looking towards objects 50, 51 and 59, the latter being of value because the mind easily selects this object possibly before both of the other two objects may be seen through aperture 58. Knob 56 and screw 55 are turned to move standards 44 and 52 until both objects 50 and 51 are viewable through aperture 58, whereupon each pair of objects 50 and 51 and frames 45 and 46 will be spaced apart a distance corresponding to the distance between the nodal points of the eyes tested, and this distance may be read on scale 47, or on a similar scale 49, secured to standard 53 and along which standard 52, with mark 48, moves as lever 54 is shifted. If scale 49 is used, then scale 47 would be unnecessary.

Referring to Figure 10, it will be seen that when objects 50 and 51 are the same distance apart as the nodal points of the eyes peering through frames 45 and 46, the rays of light, as indicated by the solid line 60, from each object to the corresponding eye will pass through the aperture in screen 57, but if the objects are positioned as indicated at 61 so that they are closer to each other than the nodal points, the rays of light, as indicated at 62, passing through the aperture in screen 57 would not strike the nodal points of the eyes of the observer but would be closer together, abreast of the eyes, as indicated at 63.

The distance between frames 45, 46 and objects 50, 51 is immaterial so long as they are far enough apart for normal vision to be effective and so long as the apertured screen is midway between the nodal points of the eyes and objects. (Nodal point is back of cornea and is compensated for in the placing of frames 45 and 46.) Numerous measurements of the distances between the same eyes under the conditions mentioned, but with the spacing of the object being viewed varied substantially, give the same result between the nodal points.

From the above disclosure, it will be apparent that the present invention provides means for readily and accurately measuring subjectively the distance between the nodal points of the eyes when the eyes are used for binocular vision without relying upon the inaccurate alignment by the optometrist or oculist of his own eye and the scale he uses with the centers of the pupils of the patient's eyes. The instrument avoids the common errors arising from attempts to measure pupillary distance with a ruler.

Obviously, once the general principles have been grasped, the details of the instrument used may be changed substantially from the suggestive forms illustrated and described herein and the exclusive use of such modifications of the invention embodying the apparatus and method disclosed is contemplated.

What is claimed is:

1. In an apparatus for determining subjectively during binocular vision of a patient's eyes the distance between the visual axes of said eyes in a plane closely adjacent to the eyes, an elongated table including a portion applicable to the patient's face adjacent to the eyes, a pair of objects optically opposite the eyes when the table portion is so applied, and movable to and from each other transversely of the line of vision of the eyes, means providing for the view of the right hand object by the left hand eye only and of the left hand object by the right hand eye only, a single sighting device optically midway said table portion and said objects and with which the lines of vision from both eyes to the respective objects will intersect simultaneously when the objects are spaced apart the same distance as the lines of vision at said plane during binocular vision, and cooperative scale means associated with the objects and indicating the distance between the centers of the objects.

2. In an apparatus for determining subjectively and during binocular vision of a person's eyes the distance between the visual axes of said eyes closely adjacent to the eyes, an elongated table, structure at one end of the table for positioning the eyes at opposite sides of the longitudinal axis of the table, a pair of objects mounted on the table at opposite sides of the longitudinal axis of the table and movable towards and away from each other transversely of the longitudinal axis of the table, means providing for the simultaneous observance of the objects by the eyes so that each eye only observes the object at the opposite side of the longitudinal axis of the table, said means including a single sighting device disposed substantially above the longitudinal axis of the table and optically midway said structure and objects so that the lines of sight from the eyes to the objects will intersect at the sighting device only when the objects are the same distance apart as the visual axes of the eyes at the same distance from the sighting device as are the objects, and means for measuring the distance between the centers of the objects.

3. A device as described in claim 1 in which the view providing means comprises a screen midway between the objects and the frame portion applicable to the patient's face, there being an aperture of restricted area in said screen substantially on a line extending between the center of said frame portion and a point midway of the objects.

4. A device as specified in claim 1 in which the frame portion applicable to the patient's face includes lens holding elements movable relative to each other transversely of the direction of vision, there being means associated with said elements and the objects so that the distance between the centers of the lenses held by said elements corresponds to the distance between said objects.

5. In an apparatus of the class described, an elongated table with annular frames at one end at opposite sides of the longitudinal center line of the table and arranged for application to a patient's eyes, an individual object associated with each of said frames but positioned so as to be out of the range of direct vision of the eyes to which the frames are applied, a mirror on said table facing and spaced from said objects and being provided with a single sighting device above said center line and viewable by both eyes simultaneously as they view the reflections of the objects in the mirror, and means for manually moving the objects relatively to each other transversely of said center line so as to reflect the mirror image of the object associated with one frame towards the other frame and in register with the image of the other object reflected towards the first-mentioned frame, and a measuring scale associated with said objects to determine the distance between them and movable relative to one object with its zero point in fixed relation to the other object.

HERBERT C. REES.